May 10, 1960 V. S. MUIR 2,936,032
WEEDING TOOL
Filed March 25, 1957
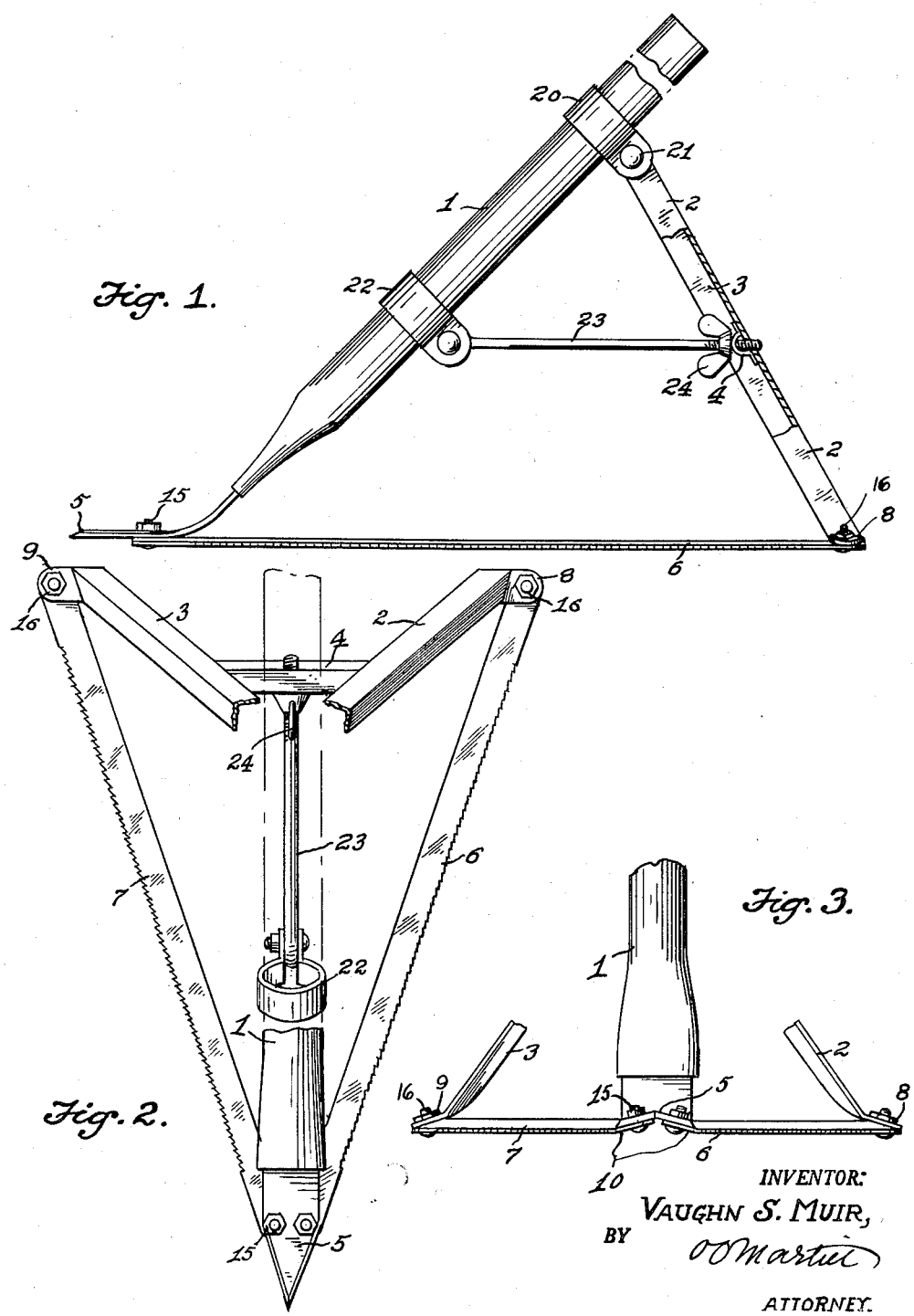
INVENTOR:
VAUGHN S. MUIR,
BY O O Martin
ATTORNEY.

United States Patent Office 2,936,032
Patented May 10, 1960

2,936,032

WEEDING TOOL

Vaughn S. Muir, Pacoima, Calif.

Application March 25, 1957, Serial No. 648,130

1 Claim. (Cl. 172—380)

This invention relates to manually operable tools for cutting weeds and other plant growth.

It is the object of the present invention to provide a weeding tool of simple and inexpensive construction and which is convenient to operate. Another object is to provide a weeding tool consisting of a light framing to which a pair of cutting members may be quickly applied and from which the members may be as readily removed. A further object is to provide a weeding tool on which the cutting members are placed in the angular relation to the framing required for speedy, effortless operation. A still further object is to provide a weeding tool the cutting members of which are downwardly inclined transversally at the angle of inclination best suited to maintain the members in uniformly spaced relation to the surface of the ground to be weeded. Another object is to provide a weeding tool which, when no longer needed may be easily and quickly disassembled and folded into convenient shape for storage.

With these and other objects in view, the invention consists in the combinations hereinafter fully described and drawings are hereto appended in which a preferred form of the invention is illustrated.

In the drawings:

Fig. 1 is a side elevational view of a weeding tool embodying the invention and with a portion of the framing thereof broken away for the sake of clearness;

Fig. 2 is a substantially corresponding plan view of the device; and

Fig. 3 is a front view of the lower portion of the device.

The device of the invention, in the form illustrated in the drawings, consists of a framing including a handle 1 from which arms 2, 3 extend downwardly and outwardly. A horizontal brace member 4 maintains the arms rigidly interconnected, substantially as indicated in the drawings.

The handle 1 is at the bottom thereof shown forwardly curved to provide a pointed head to the under side of which the ends of a pair of weed cutting members 6, 7 are secured. The members extend rearwardly and outwardly to the lower ends of the arms 2, 3, to which they are fastened. The lower ends of the arms are for this purpose shown laterally extended to provide flanges 8, 9 the bottom surfaces of which will assume a position in parallel relation to and in line with the under side of the handle head 5 when the parts are correctly adjusted for the weeding operation.

The weed cutting members consist of a pair of hack-saw blades, the serrated edges of which are outwardly directed. When these members are rearwardly flared from the axis of the device at angles of about 20°, it is found that they will cut through even the toughest weeds by applying moderate pressure to the handle. Anyone practicing shuffle hoe weeding operations will have experienced that the resistance exerted by the weeds will tend to push the blade of the hoe out of the ground. This tendency to push the tool out of the ground is largely overcome by the rearward taper of the cutting members and by the serrated outer edges thereof. I have also found it of great advantage to incline the blades laterally at an angle of about 15°, substantially as indicated at 10 in Fig. 3. This arrangement will maintain the device at the proper depth for the weeding operation without any particular effort on the part of the operator.

Hack-saw blades are generally secured in position on studs projecting from the hack-saw frame. While this arrangement may be satisfactory, I have found it advantageous to use bolts 15, 16 for this purpose, partly because the bolts will clamp the blades tightly in position and also because such small bolts are readily replaceable. Studs such as projecting from conventional hack-saw framing would in the present device gradually be eaten away by corrosion and would be difficult and expensive to replace. But different clamping means may, of course, be substituted.

Means must, even as in the conventional hack-saw frame, be provided for placing the saw blades under the proper tension and this may be done in the following manner. The arms 2, 3 are in the drawings shown pivotally mounted in a sleeve 20 fittingly engaging the handle and a bolt 21 will clamp the arms rigidly in position therein.

Another sleeve 22 is mounted further down the handle and a rod 23 is pivotally hung in this sleeve. The end of this rod extends through an opening in the brace 4 and a wing nut 24 engages the threads on the end of the rod to spread the handle and arms apart to maintain the cutting members under proper tension.

When the handle is a hard aluminum tube of the proper length for convenient operation and set at an angle of about 45° relative to the cutting members, it is found that the members will cut their way through even the toughest weeds with very little effort.

Hack-saw blades are very inexpensive, as are the small clamping bolts, and when a supply of these parts is kept on hand, it is a very simple matter to replace a broken blade. No grinding and sharpening operations are required and even old, partly worn hack-saw blades will do the weeding perfectly. I have found fine tooth blades most satisfactory. When the weeding period is over, it is a very simple and easy matter to remove the bolts 15, 16; swing the arms 2, 3 away from the end of rod 23; then to swing the rod and the arms in line with the handle The device may then be placed against or hung on a rack or wall, occupying very little space, and as conveniently packaged for shipment.

I claim:

A weeding tool which includes: an inclined handle having an end; a pair of arms, means counting said arms on said handle at a point spaced from said end of said handle for pivotal movement towards and away from said end of said handle, said arms diverging away from said handle so as to have ends spaced from one another at points remote from said handle, said arms being capable of being rotated towards and away from said end of said handle; a brace secured to each of said arms, said brace being located between said handle and said ends of said arms, said brace having a centrally located hole formed therein; a threaded rod pivotally mounted on said handle between said end of said handle and said arms, said rod extending through said hole in said brace; a nut threaded on said rod, said nut normally bearing against said cross member; a pointed head extending from said end of said handle, said pointed head having an undersurface located on the side thereof away from said handle, said undersurface being tapered away from said handle toward side edges of said pointed head, said side edges diverging from one another toward said ends of said arms; and a pair of blades, said blades being flexible when not under tension, each of said blades being secured to the surface of said head remote from said handle and to an end of one of said arms, said blades having serrated cutting edges extending from opposite sides of said tool, said blades being held under tension exerted by said nut on said brace.

References Cited in the file of this patent

UNITED STATES PATENTS

| | | |
|---|---|---|
| 479,612 | Andrus | July 26, 1892 |
| 598,603 | Malkemus | Feb. 8, 1898 |
| 649,685 | Averill | May 15, 1900 |
| 1,070,766 | Braun | Aug. 19, 1913 |
| 1,933,625 | Hovland | Nov. 7, 1933 |
| 2,134,070 | Avant | Oct. 25, 1938 |
| 2,184,968 | Woodruff | Dec. 26, 1939 |

UNITED STATES PATENT OFFICE

CERTIFICATE OF CORRECTION

Patent No. 2,936,032            May 10, 1960

Vaughn S. Muir

It is hereby certified that error appears in the printed specification of the above numbered patent requiring correction and that the said Letters Patent should read as corrected below.

Column 2, line 53, for "counting" read -- mounting --.

Signed and sealed this 18th day of October 1960.

(SEAL)
Attest:

KARL H. AXLINE
Attesting Officer

ROBERT C. WATSON
Commissioner of Patents